United States Patent
Warr

(10) Patent No.: US 9,693,208 B2
(45) Date of Patent: *Jun. 27, 2017

(54) DO-NOT-DISTURB MODES

(71) Applicant: Google Inc., Mountain View, CA (US)

(72) Inventor: Andrew Martin Warr, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/252,064

(22) Filed: Aug. 30, 2016

(65) Prior Publication Data

US 2016/0373905 A1    Dec. 22, 2016

Related U.S. Application Data

(63) Continuation of application No. 14/080,701, filed on Nov. 14, 2013, now Pat. No. 9,462,438.

(51) Int. Cl.
*H04W 4/16* (2009.01)
*H04M 3/436* (2006.01)
(Continued)

(52) U.S. Cl.
CPC ............ *H04W 4/16* (2013.01); *H04M 3/436* (2013.01); *H04W 4/026* (2013.01); *H04W 68/04* (2013.01); *H04M 1/72533* (2013.01)

(58) Field of Classification Search
CPC ....... H04W 4/16; H04W 4/026; H04W 64/00; H04M 3/436; H04M 1/72533
(Continued)

(56) References Cited

U.S. PATENT DOCUMENTS 6,466,969 B1    10/2002    Bunney et al.
8,355,491 B1    1/2013    Butt
(Continued)

FOREIGN PATENT DOCUMENTS

EP    2001211    12/2008
WO    WO-2004/049615    6/2004

OTHER PUBLICATIONS

Mack, "Reivew: Moto X from Google's Motorola," Gizmag.com, Aug. 2013, retrieved from <http://www.gizmag.com/review-moto-x-android-google-motorola/28623>.

(Continued)

*Primary Examiner* — Vladimir Magloire
*Assistant Examiner* — Frank Donado
(74) *Attorney, Agent, or Firm* — McDermott Will & Emery LLP

(57) ABSTRACT

Methods related to do-not-disturb modes activated by a mobile device are provided. An example method may include receiving a do-not-disturb notification by a mobile device indicating that the mobile device is in a do-not-disturb mode. The method may further include temporarily disabling, when the mobile device is in the do-not-disturb mode, causing at least one communications feature associated with the mobile device and one or more additional communications features associated with one or more ancillary devices to be temporarily disabled. Another example method may include detecting whether a mobile device is in one of a stationary display screen face down state or a moving display screen face down state, and, when the mobile device is in at least one of the stationary display screen face down state or the moving display screen face down state, causing a first communications feature associated with the mobile device to be temporarily disabled and (Continued)

sending a do-not-disturb notification to a server. Systems and computer-readable media are also described.

20 Claims, 5 Drawing Sheets

(51) Int. Cl.
*H04W 4/02* (2009.01)
*H04W 68/04* (2009.01)
*H04M 1/725* (2006.01)

(58) Field of Classification Search
USPC .......................................................... 455/418
See application file for complete search history.

(56) References Cited

U.S. PATENT DOCUMENTS

| | | | |
|---|---|---|---|
| 8,385,884 B1* | 2/2013 | Hertzfeld | H04M 3/436 455/411 |
| 9,462,438 B2* | 10/2016 | Warr | H04W 4/026 |
| 2007/0004451 A1 | 1/2007 | Anderson | |
| 2007/0264981 A1* | 11/2007 | Miller | H04W 48/18 455/414.1 |
| 2008/0045186 A1 | 2/2008 | Black et al. | |
| 2008/0070609 A1 | 3/2008 | Ackley | |
| 2008/0254776 A1 | 10/2008 | Ma | |
| 2009/0029676 A1 | 1/2009 | Thalapaneni et al. | |
| 2009/0153490 A1 | 6/2009 | Nymark et al. | |
| 2010/0008489 A1 | 1/2010 | Tucker et al. | |
| 2010/0130213 A1 | 5/2010 | Vendrow et al. | |
| 2011/0281580 A1 | 11/2011 | Tonogai et al. | |
| 2012/0158943 A1* | 6/2012 | Esteve Balducci | H04L 67/24 709/224 |
| 2012/0179980 A1 | 7/2012 | Whalin et al. | |
| 2012/0214552 A1 | 8/2012 | Sirpal et al. | |
| 2012/0270609 A1 | 10/2012 | Luke et al. | |
| 2013/0142056 A1* | 6/2013 | Abplanalp | H04W 8/18 370/252 |
| 2013/0316687 A1 | 11/2013 | Subbaramoo et al. | |
| 2013/0324081 A1 | 12/2013 | Gargi et al. | |
| 2014/0277932 A1* | 9/2014 | Prakah-Asante | B60K 28/02 701/36 |
| 2014/0349618 A1 | 11/2014 | Che et al. | |

OTHER PUBLICATIONS

Mack, :Moto X: The first two weeks, Gizmag.com, Aug. 2013, retrieved from <http://www.gixmag.com/two-weeks-motorola-google-moto-x-review/28722>.

Halleck, "Moto X: Top 5 Features of the Motorola Phone from Google (GOOG)," International Business Times, Aug. 2013.

Motorola, "Moto X Features Active Display," 2013, retrieved from <http://www.motorola.com/us/Moto-X-Features-Active-Display/motox-features-3-active-display.html> Nov. 7, 2013.

Extended European Search Report from European Application No. 14862516.3, dated Apr. 5, 2017.

* cited by examiner

DO-NOT-DISTURB MODES

CROSS-REFERENCE TO RELATED APPLICATIONS

This application is a continuation of U.S. patent application Ser. No. 14/080,701, entitled "DO-NOT-DISTURB MODES," filed on Nov. 14, 2013, the contents of which are hereby incorporated by reference in their entirety.

BACKGROUND

In today's "always on" communications environment, computers, mobile phones, tablets, and other communications devices provide a constant stream of stimuli to the users of these devices. The constant stream of emails, text messages, notification, and other alerts can pose a significant challenge to focusing and task completion. This problem is exacerbated by the number of communications devices and services to which a user may have access at any given moment. Immediate alerts and real-time communications are necessary in many instances and may provide great efficiencies for the user of the communications device or devices. However, in some instances, the user of the communications device or devices may need complete focus on a particular task and may require a period of uninterrupted time to stay on task.

SUMMARY

The present disclosure relates generally device modes, and more particularly to techniques related to do-not-disturb modes activated by a device.

The disclosed subject technology relates to computer-implemented methods for placing one or more communications devices and/or services into a do-not-disturb mode such that new communications messages may be temporarily suspended. It is to be understood that various implementations of the subject technology may include any, all, or none of the following features. An example method may comprise receiving a do-not-disturb notification by a mobile device indicating that the mobile device is in a do-not-disturb mode. The method may further comprise causing, when the mobile device is in the do-not-disturb mode, at least one communications feature associated with the mobile device and one or more additional communications features associated with one or more ancillary devices to be temporarily disabled.

Another example computer-implemented method may comprise detecting whether a mobile device is in one of a stationary display screen face down state or a moving display screen face down state. The method may further comprise, when the mobile device is in at least one of the stationary display screen face down state or the moving display screen face down state, causing a first communications feature associated with the mobile device to be temporarily disabled and sending a do-not-disturb notification to a server.

The disclosed subject matter further relates to systems for facilitating do-not-disturb modes. An example system may comprise one or more processors, and a memory including instructions that, when executed by the one or more processors, cause the one or more processors to perform operations. The one or more processors of the system may be configured to receive a do-not-disturb notification by a mobile device indicating that the mobile device is in a do-not-disturb mode. The one or more processors of the system may be further configured to, when the mobile device is in the do-not-disturb mode, temporarily disable at least one communications feature associated with the mobile device and one or more additional communications features associated with one or more ancillary devices by causing at least some communications with the mobile device and the one or more ancillary devices to be temporarily suspended.

The disclosed subject matter further relates to mobile devices for facilitating do-not-disturb modes. An example mobile device may comprise a display screen, one or more processors, and a memory including instructions that, when executed by the one or more processors, cause the one or more processors to perform operations. The one or more processors of the mobile device may be configured to detect whether the mobile device is in a stationary display screen face down state. The one or more processors of the system may be further configured to send, when the mobile device is in the stationary display screen face down state, a first notification message that the mobile device is in a do-not-disturb mode.

The disclosed subject matter also relates to example machine-readable media comprising instructions stored therein, which when executed by a system, cause the system to perform operations for facilitating do-not-disturb modes. An example machine-readable medium may comprise instructions for receiving a do-not-disturb notification by a mobile device indicating that the mobile device is in a do-not-disturb mode. The machine-readable medium may further comprise instructions for causing, when the mobile device is in the do-not-disturb mode, at least some communications to the mobile device to be temporarily suspended, wherein the at least some communications are related to a communications feature associated with the mobile device.

Another example machine-readable medium may comprise instructions for detecting whether a mobile device is in a stationary display screen face down state. The machine-readable medium may comprise instructions for sending, when the mobile device is in the stationary display screen face down state, a do-not-disturb notification to a server such that at least some communications to an ancillary device are temporarily suspended, wherein the at least some communications are related to a communications feature associated with the ancillary device.

These and other aspects may include several advantages including, but not limited to, enabling a user to activate and deactivate various do-not-disturb modes from the user's mobile device that can provide the user with periods of time uninterrupted by new communications (e.g., incoming phone calls, new emails, new text messages, etc.).

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
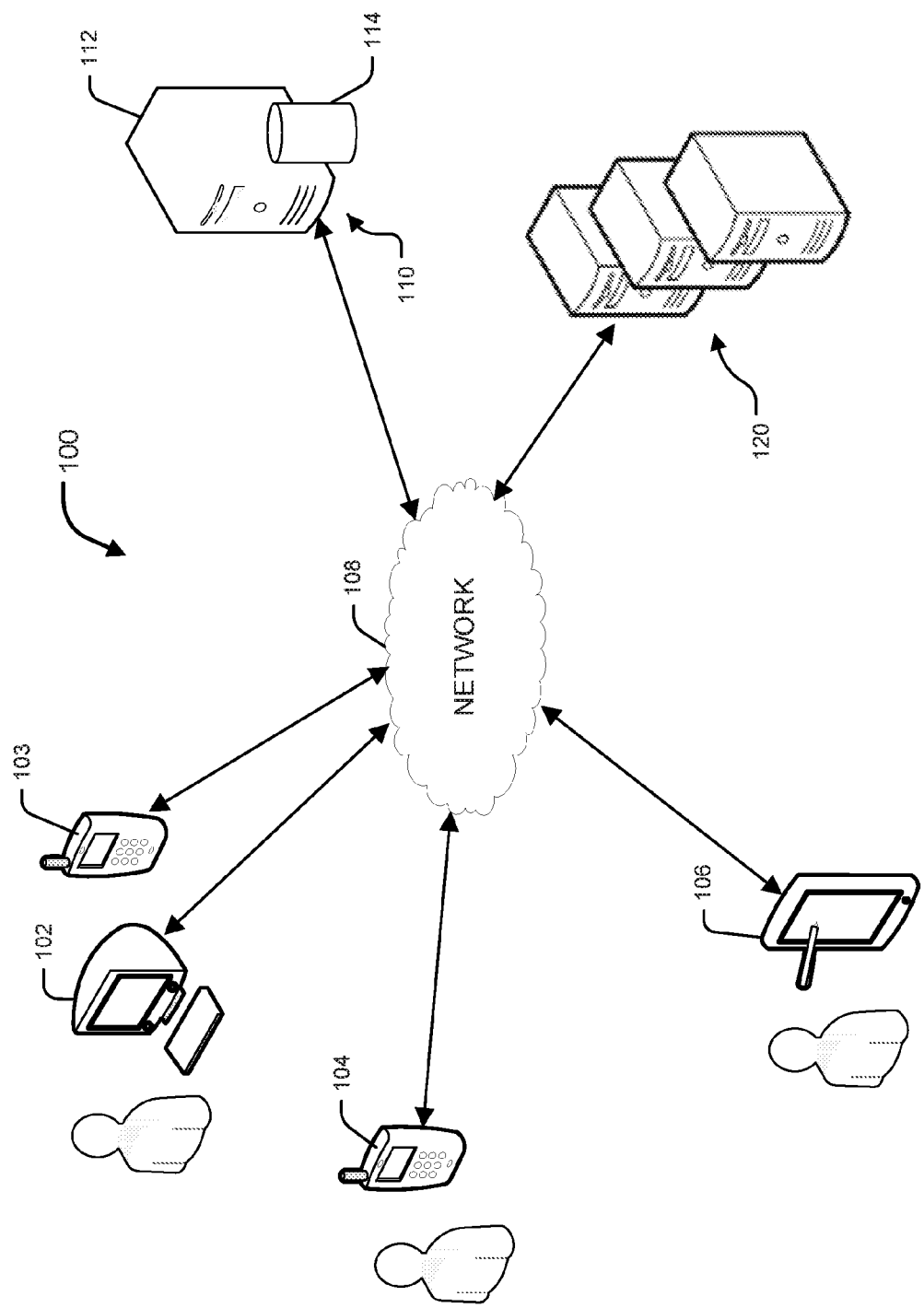
FIG. 1 illustrates an example client-server network environment for facilitating do-not-disturb modes in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details. In some instances, well-known structures and components are shown in block diagram form in order to avoid obscuring the concepts of the subject technology.

In accordance with aspects of the subject technology, techniques to place one or more communications devices and/or services into a do-not-disturb mode are described herein.

A user usually has a mobile device (e.g., smart phone or tablet) with him or her at all times throughout the day. At certain times, a user may place his or her mobile device (e.g., mobile phone or tablet) on his or her desk or table with the screen facing up. Thus, it can be reasonably inferred that the user is willing to receive or even welcoming a communications event. In this regard, the user can see an incoming phone call, new notification, new email message, or like event, for example, while performing other tasks within the general proximity of the mobile device. The display screen of the mobile device will generally be activated when such a new communications event occurs thereby drawing the attention of the user to answer or acknowledge the new event. For example, the screen may flash with a notification, the speaker may generate a sound, and/or the mobile device may vibrate to alert the user to the new communications event.

In contrast, there are certain periods of time for which the user may not wish to be disturbed. Placing the mobile device in a drawer or turning the phone over with the screen facing down on a conventional mobile device generally does little to stop the disruption caused by a new communications event. For example, a sound or vibration is typically used as a notification mechanism. Additionally, reflections from the screen's activation may also be apparent on the surface of the desk or table, for example. Such disruptions can interrupt the user when attempting to concentrate on a particular matter while at one's desk or attending a meeting, for example. However, aspects of the subject technology can disable communications events when the screen of the mobile device is placed in a downward facing orientation. Moreover, communication events from other devices can likewise be disabled when the mobile device is placed with the screen facing downward.

According to certain aspects of the subject technology, a background application, system, or service may run on the mobile device to detect when the screen of the mobile device is facing up or facing down using the mobile device's accelerometer, gyroscope and/or like mechanism. The background application, system, or service may also detect whether the mobile device is stationary or moving (e.g., with further use of the mobile device's location identification system), and, if moving, at what speed the mobile device is moving. Additionally, the background application or service may utilize geolocation information (e.g., GPS device data or like information from a location identification system) to ascertain a present location of the user. This information, individually in some instances and in combination in other instances, may be used to detect whether the mobile device is in a first physical orientation intended to trigger a do-not-disturb mode.

Consequently, aspects of the subject technology can be utilized to easily and immediately eliminate multiple streams of communications stimuli thereby providing a user with periods of time free from interruptions by one or more communications devices.

FIG. 1 illustrates an example client-server network environment which may support a do-not-disturb system and be used to implement various techniques for facilitating do-not-disturb modes. Network environment 100 may include a number of electronic devices 102, 103, 104, 106 communicably connected to one or more servers 110, such as by network 108. In other examples, electronic devices 102, 103, 104, 106 may be communicably connected to one another, such as by network 108, but not communicably connected to one or more servers 110.

In the example of FIG. 1, server 110 may host one or more systems or services including but not limited to a do-not-disturb system. In some examples, servers 110 can be a single computing device such as a computer server or can represent more than one computing device working together to perform the actions of a server computer (e.g., cloud computing or a distributed system). Server 110 may be coupled with various databases, storage services, or other computing devices. Server 110 and the coupled databases, storage services, or other computing devices may be collocated, or may be disparately located. For example, server 110 may include one or more processing devices 112 and one or more data stores 114. One or more processing devices 112 may execute instructions stored in one or more data stores 114, for example, to facilitate do-not-disturb modes on one or more communications devices. One or more data stores 114 may store the computer instructions on non-transitory computer-readable medium.

One or more communications servers 120 may provide communications services or applications in the example of FIG. 1. In some implementations, the one or more communications servers 120 may be designed in a similar manner as described above with respect to server 110. The one or more communications servers 120 may host one or more communications systems or services including but not limited to a mobile phone service, email service, text message service, Voice over IP (VoIP) service, video chat service, etc. These communication systems or services may be provided to electronic devices 102, 103, 104, 106, for example. The one or more communications servers 120 may also communicate server 110.

Network 108 may be a public communication network, a private communications network, or a combination of both. In certain examples, network 108 can include any one or more of a personal area network (PAN), a local area network (LAN), a campus area network (CAN), a metropolitan area network (MAN), a wide area network (WAN), a broadband network (BBN), the Internet, and the like. Further, network 108 can include, but is not limited to, any one or more of the following network topologies, including a bus network, a star network, a ring network, a mesh network, a star-bus network, tree or hierarchical network, and the like.

Network 108 may be a public communication network (including, but not limited to, the Internet, cellular data network, cable data network, or dialup modems over a public switched telephone network) or a private communications network (such as, for example, private local area network ("LAN") or leased-line network). Network 108 may also include, but is not limited to, any one or more of the following network topologies, including a bus network, a star network, a ring network, a mesh network, a star-bus network, a tree or hierarchical network, and the like.

In some implementations, electronic devices 102, 103, 104, and 106 can be computing devices such as laptop or desktop computers, smartphones, personal digital assistants ("PDAs"), portable media players, tablet computers, televisions or other displays with one or more processors coupled thereto or embedded therein, or other appropriate computing devices that can be used to for displaying a web page or web application. In the example of FIG. 1, electronic device 102 is depicted as a desktop computer, electronic devices 103, 104 are depicted as smartphones, and electronic device 106 is depicted as a tablet device.

Communications between electronic devices 102, 103, 104, 106, and server 110 may be facilitated through the Hypertext Transfer Protocol (HTTP) communication protocol. Other communication protocols may also be used including, for example, Extensible Messaging and Presence Protocol (XMPP) communication, for some or all communications between electronic devices 102, 103, 104, 106 and server 110. In other examples, electronic devices 102, 103, 104, 106 may be in communication with one another without communicating with server 110.

User interacting with a client device (e.g., electronic devices 103, 104, or 106) may perform one or more activities with respect activating a do-not-disturb mode. A do-not-disturb system (e.g., hosted at server 110) may cause new communications by one or more communications services (e.g., provided by one or more communications servers 120) to be temporarily suspended or disabled. The one or more communications services may be provided to a user by one or more electronic devices (e.g., electronic devices 102, 103, 104, or 106), for example.

In the example of FIG. 1, each electronic device 102, 103, 104, 106 may receive text, audio, or video streams from at least one other of electronic devices 102, 103, 104, 106 related to a communications service. Accordingly, electronic devices 102, 103, 104, 106, may include, or may be coupled to, a microphone, camera, or other device for capturing audio or video, and may include an output device for providing text, audio, or video.

In operation, server 110 may provide and process operations for causing new communications by one or more communications services provided by one or more communications servers 120 to be temporarily suspended or disabled. Electronic devices 102, 103, 104, 106 may each establish a communications with server 110 or one or more servers 120, for purposes of establishing do-not-disturb modes related to one or more communications systems or services.

Figure 2:
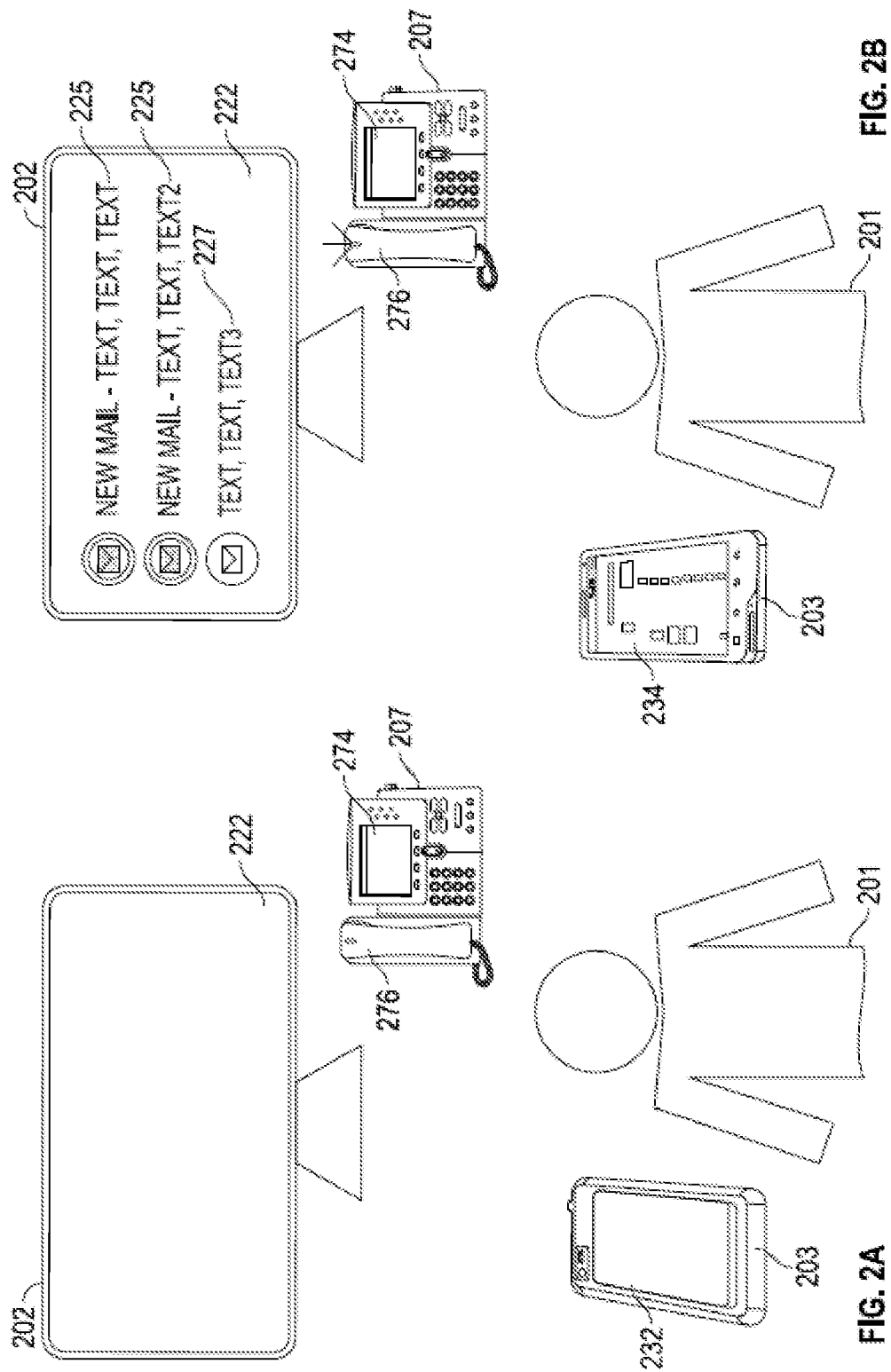
FIGS. 2A-2B illustrate examples of do-not-disturb mode systems and aspects of the subject technology associated with multiple communications services and devices.

Techniques for facilitating do-not-disturb modes are further described below with respect to FIGS. 2-4 and continued reference to FIG. 1.

FIGS. 2A-2B illustrate examples of do-not-disturb mode systems and aspects associated with one or more communications services. For example, user 201 may wish to focus on a particular task at work or home. Aspects of the subject technology enable mobile device 203 to serve as an object or mechanism to provide user 201 with a period of time free from interruptions by one or more communications devices. In certain examples, when user 201 does not want to be disturbed, user 201 turns mobile device 203 over with a display screen side 234 of the mobile device 203 facing down and laying flat on a desk or table and aback side 232 of the mobile device 203 facing up toward the user 201 (FIG. 2A). A do-not-disturb system, application, background service, or module runs on the mobile device 203 that utilizes accelerometer, gyroscope and/or like mechanism of the mobile device 203 to detect when the display screen side 234 is facing up and laying flat when the display screen side 234 is facing down.

When mobile device 203 is on the desk or table there is little to no movement of the mobile device. Such a situation can also be detected by the mobile device 203 by using the accelerometer, gyroscope and/or like mechanisms, and can be designated a stationary face down state. In other situations, mobile device 203 may be facing down or somewhat facing down, but moving, for example, when the mobile device 203 is placed in a back pack or purse while user 201 is walking or placed facing down on a car seat or console while user 201 is driving. This facing down and moving configuration can likewise be detected by the mobile device 203 by using the accelerometer, gyroscope and/or like mechanisms, and may be designated a moving face down state. In some implementations, a moving face down state will not trigger a do-not-disturb mode, however, in other implementations, a moving face down state will trigger a do-not-disturb mode.

It is to be understood that when mobile device 203 is in a stationary face down state, small movements, particularly when the mobile device 203 is moved while keeping the display screen side 234 of the mobile device facing down, will not cause a change in states is some implementations. For example, user 201 may need to momentarily slide mobile device 203 out of the way to access certain papers or rearrange the user's workspace without intending to leave a present do-not-disturb mode of the user 201. Accordingly, some threshold of movement of mobile device 203 is permitted without changing states from a stationary face down state.

In certain implementations, when mobile device 203 is deemed to be in a stationary face down state, the do-not-disturb system of the mobile device 203 may operate to send a signal or a notification to a service or server (e.g., a signal sent by electronic device 103 to a cloud service on server 110 via network 108). The service or server can then identify that the mobile device 203 is in a do-not-disturb mode, and send to one or more other services or servers (e.g., a broadcast message by server 110 to one or more communications servers 120 including email servers and Von) servers) indication that the mobile device 203 is in a do-not-disturb mode and to temporarily disable or suspend certain communications features.

The one or more services or servers may include services associated with the mobile device 203 (e.g., a phone service, texting service, notifications service, email service for accounts associated with and accessible on the mobile phone). The one or more service or servers may also include services associated with the user 201 of the mobile device 203, but not directly associated with the mobile device 203 itself. For example, an email account associated with computer 202, but not associated with the mobile device 203 may be notified that the user 201 is in a do-not-disturb mode. Similarly, a phone service associated with phone 207, but not associated with the mobile device 203 may be notified that the user 201 is in a do-not-disturb mode.

Accordingly, when mobile device 203 is in a stationary face down state and do-not-disturb system of the mobile device 203 places the mobile device 203 in a do-not disturb mode as illustrated in the example of FIG. 1A, the mobile device 203 does not receive any (or some) communications from various services (e.g., phone calls, emails, text messages, notifications) associated with the mobile device 203. In some implementations, if mobile device 203 receives a communication from a communications service that is not aware that the user 201 and the mobile device 204 is in a do-not-disturb mode (e.g., a remote video chat service), the do-not-disturb system of the mobile device 203 may intercept and not process the communication until the mobile device 203 is no longer in the do-not-disturb mode.

As further illustrated in FIG. 1A, when the mobile device 203 in the do-not disturb mode, mobile device 203 may not receive any (or some) communications from certain services (e.g., phone calls, email s, text messages, notifications) associated with one or more other communication devices. For example, computer 202 will not receive communications from one or more communications services associated with the computer 202 in some implementations. Display 222 of the computer 202 will not show any new communications messages while the mobile device 203 is in the do-not-disturb mode, for example. It is to be understood that in some implementations, display 222 and computer 202 are completely usable for a multitude of purposes while in the mobile device 202 is in the do-not-disturb mode.

For example, user 201 may need to utilize a word processing application installed on the computer 202 while in the do-not-disturb mode. Moreover, the user 201 may need to use an application associated with a service that has its new communications prohibited while in the do-not-disturb mode. For example, the user 201 may need to access to previous mails to complete a task while the user 201 is in the do-not-disturb mode. The user 201 could access previous mails, and even send new email messages in some implementations, however, no new emails would be received as long as the mobile device 203 remained in the do-not-disturb mode.

Similarly, phone 207 may indicate on screen 274 that the phone has entered a do-not-disturb status while the mobile device 203 is in a do-not-disturb mode. In some implementations, screen 274 may not provide such an indication even though phone 207 will not receive incoming calls while mobile device 203 is in a do-not-disturb mode. Similarly, voice mail indicator light 276 on phone 207 will not illuminate when a voicemail is left for user 201 while mobile device 203 is in the do-not-call mode.

When user 201 turns mobile device 203 over so that display screen side 234 is facing up as illustrated in the example of FIG. 2B (or otherwise changes the physical orientation of the mobile device 203 from a stationary face down state), do-not-disturb system of mobile device 203 will change to an active mode. Accordingly, the do-not-disturb system of the mobile device 203 may operate to send a signal or notification to a service or server (e.g., a signal sent by electronic device 103 to a cloud service on server 110 via network 108) to indicate that mobile device is in the active mode (or no longer in the do-not-disturb mode). The service or server can then identify that the mobile device 203 is in an active mode, and send to one or more other services or servers (e.g., a broadcast message by server 110 to an email services or server and a VoIP service or server) an indication that a user 201 of the mobile device 203 is in an active mode and the associated service can send new communications (and previously-suspended communications that occurred during the do-not-disturb mode) to the devices that receive the communications associated with each of the other services or servers.

For example, when mobile device 203 is no longer in a do-not-disturb mode, new email messages 225 may be received by computer 202 and shown on display 222 along with old email messages 227 that were received prior to the mobile device 203 entering the do-not-disturb mode (e.g., the old mails 227 may be mails that could have been used by user 201 if needed to be accessed to complete a task while the mobile device 203 was in the do-not-disturb mode). Similarly, when the mobile device 203 is no longer in the do-not-disturb mode, phone 207 may receive incoming calls. If a voice message was received while mobile device 203 was in the do-not-disturb mode, screen 274 may provide text indicating such and voice mail indicator light 276 on phone 207 may illuminate when the mobile device 203 transitions to an active mode, for example.

Figure 3:
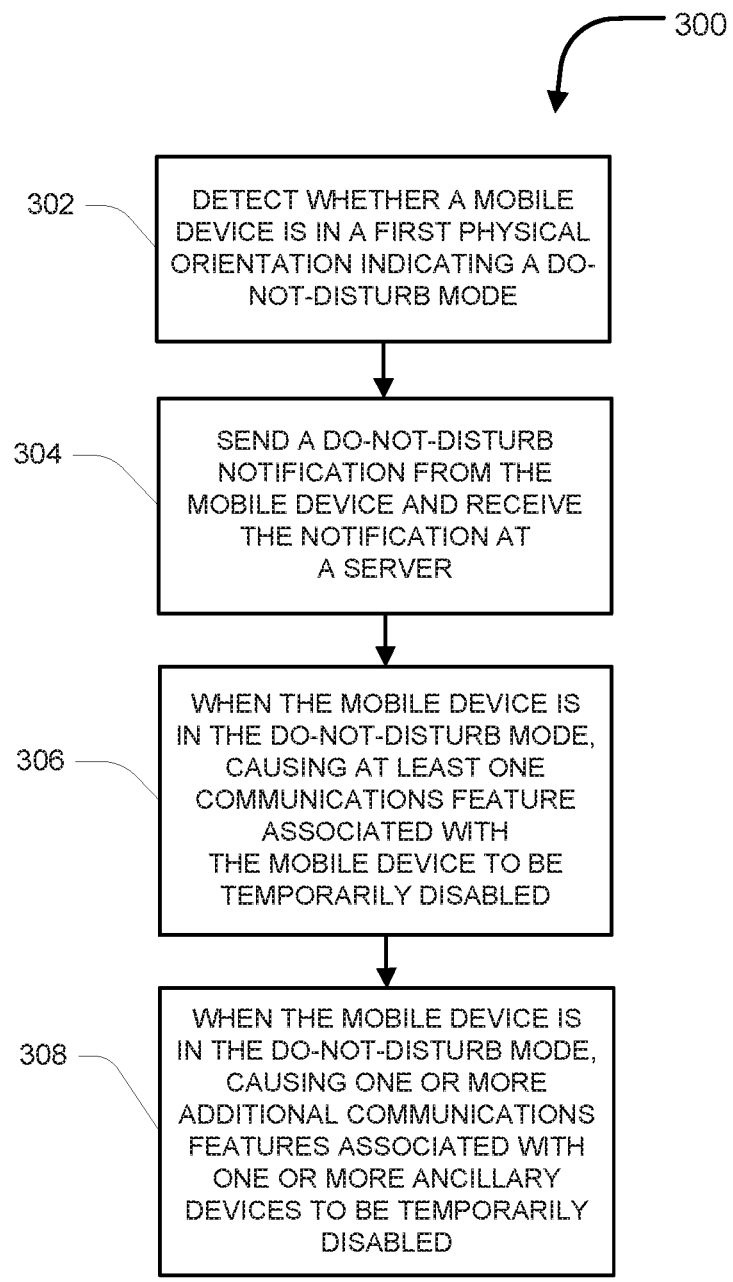
FIG. 3 a is a flow diagram illustrating an example process for activating or entering a do-not-disturb mode in accordance with various aspects of the subject technology.

FIG. 3 illustrates a flow diagram of an example process for activating or entering a do-not-disturb mode. It is to be understood that the operations in process 300 may be used in conjunction with other processes and aspects of the present disclosure. Although process 300 is described with relation to the examples of FIGS. 1 and 2, process 300 is not limited to such.

In block 302, a system of a mobile device (e.g., electronic device 103, 104, 106, or mobile device 203) may detect whether the mobile device is in first physical orientation. For example, the first physical orientation of the mobile device may be an orientation where a display screen of the mobile device is substantially downwardly facing. In some implementations, the first physical orientation can be a stationary display screen face down state or a moving display screen face down state, and may be indicative if a do-not-disturb mode.

For example, mobile device may be determined to be in a substantially face down position when the mobile device is facing down, but positioned at a slight angle due to an angle of a desk or other surface on which the device is placed. Moreover, mobile device may be determined to be substantially stationary when the mobile device generally remains in the same position within certain threshold movements or tolerances that would not generally be deemed as intent by a user to move the mobile device in a manner to change its status from a do-not-disturb mode.

In block 304, a do-not-disturb notification may be sent by the mobile device and received by a server (e.g., server 110). The do-not-disturb notification indicates to the server that the mobile device is in a do-not-disturb mode according to certain implementations. In some implementations, a do-not-disturb notification may be sent with regard to communications features associated with the mobile device and features associated with ancillary devices. The server may receive the do-not-disturb notification and perform operations related to the do-not-disturb mode. In other implementations, a not-disturb notification may be sent with regard to communications features associated with ancillary devices operations and operations related to the do-not-disturb mode for certain communications features associated with the mobile device are performed by the mobile device.

In block 306, when the mobile device is in the do-not-disturb mode, at least one communications feature associated with the mobile device may be temporarily disabled. For example, incoming calls to the mobile device may be temporarily suspended. In another example, new email messages to the mobile device may be temporarily suspended.

In some implementations, a serve e.g., server 110) may receive a do-not-disturb notification by the mobile device and cause the at least one communications feature associated with the mobile device to be temporarily suspended or disabled. Certain communications features or services that utilize a web browser can be temporarily suspended or disabled by a web page associated with the communications feature or service by preventing the web page from updating. For example, a web browser extension may intercept or otherwise deny any refreshing of the relevant web page or pages while the mobile device is in the do-not-disturb mode.

Alternatively, or in addition, the mobile device may cause communications feature associated with the mobile device to be temporarily suspended or disabled. For example, operations may be performed on the mobile device relating to suspending alerts regarding new notifications, suspending alerts regarding new emails, or disabling ringing or indications of incoming call and received voice messages.

It is to be further appreciated that various aspects and implementations of do-not-disturb modes are contemplated. For example, user may select which of the communications features associated with the mobile device and additional communications features associated with ancillary devices that the user wishes to temporarily suspend or disable while in a do-not-disturb mode. Accordingly, a user interface may be provided such that various features and services that can be temporarily suspended or disabled when the mobile device is in the do-not-disturb mode are selectable via the user interface.

Similarly, within each communications feature or services, a subset of communication may be selectable in certain implementations. For example, one or more contacts in an email service or application may be selected for bypass such that emails may be received from the one or more selected contacts even when device is in a do-not-disturb mode.

In block 308, when the mobile device is in the do-not-disturb mode, one or more additional communications features associated with one or more ancillary devices may be temporarily disabled. In certain implementations, a server (e.g., server 110) may cause one or more additional communications features associated with one or more ancillary devices to be temporarily suspended or disabled. For example, incoming calls to a phone (e.g., phone 207) may be temporarily suspended. In another example, new emails to a computer (e.g., computer 202) may be temporarily suspended.

In some implementations, a client instance of a service or application affected by a do-not-disturb mode of a mobile device may be configured to request the server to provide a current mode (e.g., in a do-not-disturb or active mode) for the particular service associated with the client instance. The server can identify the current mode to the client instance associated with the particular service, and the client instance can therefore allow or not allow new messages based on that client instance (e.g., an email application accessible from a web page accessible by computer 202).

For example, an intercept system (e.g., active on either the mobile phone or an ancillary device) may be associated with a specific service or application and may be looking for notifications coming through to the service or application (e.g., a piece of JavaScript code may be inserted that is related to the service or application where it is looking for updates or notifications). The intercept system can establish communications to a server (e.g., communication to server 110 using an extensible markup language (XML) HTTP request) a present mode of the mobile device. If the mobile device is in a do-not-disturb mode, then the intercept system can temporarily suspend new communications messages or notifications (e.g., by removing or disabling a notification user interface associated with the service or application).

In accordance with some aspects, communications that are temporarily suspended, disabled, or intercepted while device is in a do-not-disturb state may be based on a notification level associated with a particular communication (e.g., emails marked as "high importance" may be permitted by user and/or system even when the associated email service is subject to restriction during a do-not-disturb mode). For example, a notification application programmable interface (API) can be utilized to identify a level of the notification associated with a particular communication by a communication feature or service to determine whether the communication is urgent/high or default.

In some implementations, a communication feature or service may identify to other users that the user of the mobile device is in a do-not-disturb mode. For example, a chat application or service may identify the user of the device in a do-not-disturb mode as "off-line" or "do-not-disturb" to other users that normally would be able to connect to the user of the mobile device.

Figure 4:
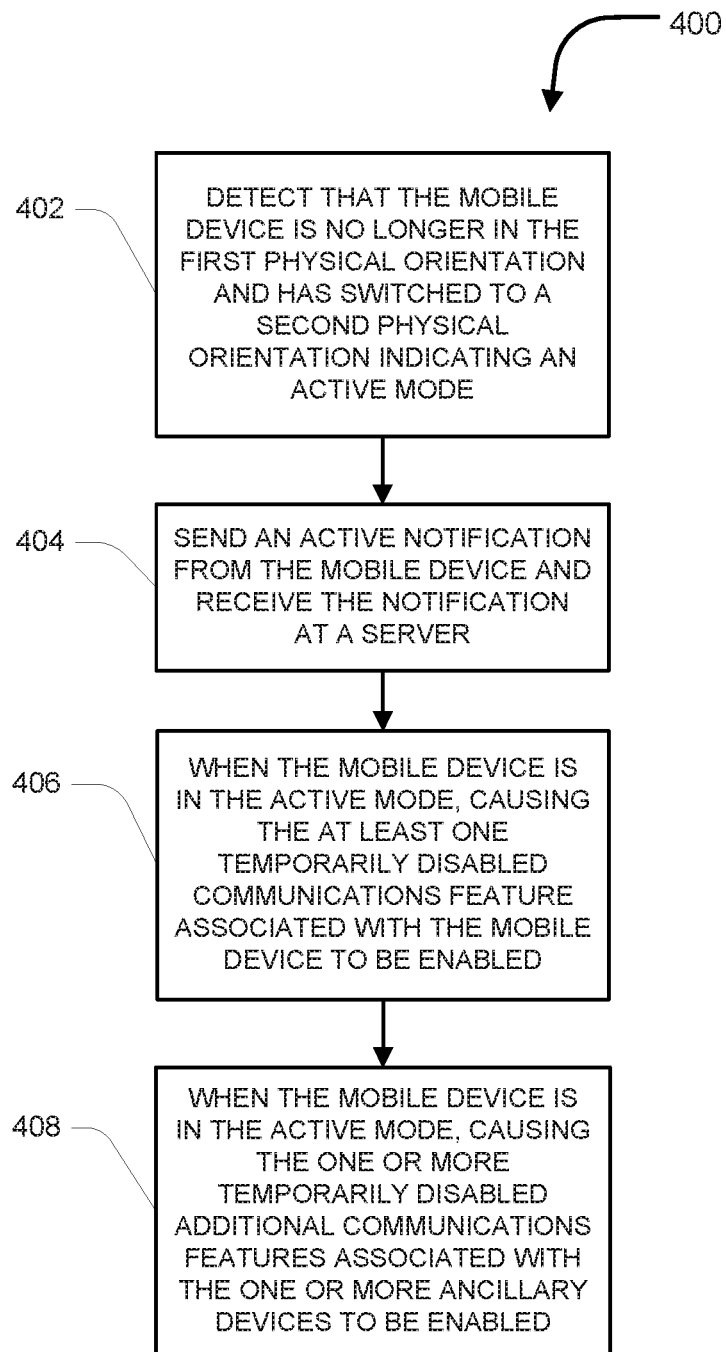
FIG. 4 is a flow diagram illustrating an example process for deactivating or switching from a do-not-disturb mode to an active mode in accordance with various aspects of the subject technology.

FIG. 4 illustrates a flow diagram of an example process for deactivating or switching from a do-not-disturb mode to an active mode. It is to be understood that the operations in process 400 may be used in conjunction with other processes and aspects of the present disclosure. Although process 400 is described with relation to the examples of FIGS. 1 and 2, process 400 is not limited to such.

In block 402, a system of a mobile device (e.g., electronic device 103, 104, 106, or mobile device 203) may detect that the mobile device is no longer in the first physical orientation. For example, the display screen of the mobile phone may be flipped so that it is in an upwardly facing orientation or in a second physical orientation distinct from the first orientation. In some implementations, the second physical orientation may be indicative of an active mode (e.g., a mode opposite the do-not-disturb mode where communications features operate as configured on the mobile device or ancillary devices have switched from the do-not-disturb mode to the active mode and may now accept new communications messages).

In block 404, an active notification may be sent by the mobile device and received by a server (e.g., server 110). In accordance with certain implementations, the active notification indicates to the server that the mobile device is in an active mode.

In block 406, when the mobile device is in the active mode, for instance, in response to the received active notification, a server may cause the temporarily disabled at least one communications feature associated with the mobile device to be enabled. For example, incoming calls to the mobile device may be permitted as would normally be completed to the mobile device. In another example, new email messages to the mobile device may be permitted and those messages that occurred while the mobile device was in the do-not-disturb mode may be provided.

In block 408, when the mobile device is in the active mode, for instance, in response to the received active notification by the mobile device, a server may cause the temporarily disabled at least one communications feature associated with the mobile device and the temporarily disabled one or more additional communications features associated with one or more ancillary devices to be enabled. For example, incoming calls to a phone (e.g., phone 207) may be permitted when the mobile phone is in the active mode. In another example, new emails to a computer (e.g., computer 202) may be received when the mobile phone is in the active mode those messages that occurred while the computer was in the do-not-disturb mode may be provided.

In an example where a communications feature or service that utilize a web browser can be temporarily suspended or disabled by a web page associated with the communications feature or service, the web page may be refreshed and the new communications message (e.g., the messages that occurred during the do-not-disturb mode) will come through when the mode of the mobile device changes from the do-not-disturb mode to the active mode. In other examples, notifications or communications may be collected or batched and sent upon a change from the do-not-disturb mode to the active mode.

In accordance with certain aspects, a synchronization system or module operative on one or more servers or cloud service (e.g., server 110, one or more communications servers 120, and/or a plurality of servers configured to provide cloud services) for synching and providing communications between a client instance or device-side application (e.g., an email application on electronic device 103, mobile phone 203, or computer 202) and one or more origination servers or systems of a plurality of services may be provided such that new notifications or communications to the client instance or device-side application can be temporarily suspended when a do-not-disturb mode is activated. When the do-not-disturb mode is deactivated, the synchronization system or module on the one or more servers or cloud service can be operable to send collected or batched notifications or communications upon a change from the do-not-disturb mode to the active mode, for example, or otherwise instruct the one or more origination servers or systems of the plurality of services to allow new notifications or communications and send such previously suspended notification or communication to the client instance or device-side application.

In certain implementations, an intercept system or module operable on a device (e.g., on either the mobile phone or an ancillary device) can be associated with a specific service at the client instance or device-side application and operable to receive a signal from the synchronization system or module on one or more servers or cloud service (e.g., server 110, one or more communications servers 120, and/or a plurality of servers configured to provide cloud services) to place that specific service at the client instance or device-side application in a do-not-disturb mode. Accordingly, the intercept system or module may operate to further intercept or disallow new communications to the device, for example, when the specific service may receive new notifications or communications from various remote servers, endpoint devices, or the like that are not in communication with the synchronization system or module on the one or more servers or cloud service. Similarly, a corresponding signal placing the specific service at the client instance or device-side application into an active mode may likewise be received by the intercept system or module on the device when the do-not-disturb mode is deactivated.

In some examples, a user interface associated with the synchronization module may be provided (for instance, in a dashboard-style configuration) so that various services to be affected by the do-not-disturb mode are selectable at a user level (e.g., an on-off switch for each particular service provided to a user that is to be part of a do-not-disturb service) and applied across multiple devices (e.g., computer 202, mobile phone 203, and/or phone 207). The user interface may further provide notification level or exception-based selectable features (e.g., service-related or device-specific customized configurations) of various do-not-disturb mode implementations.

Figure 5:
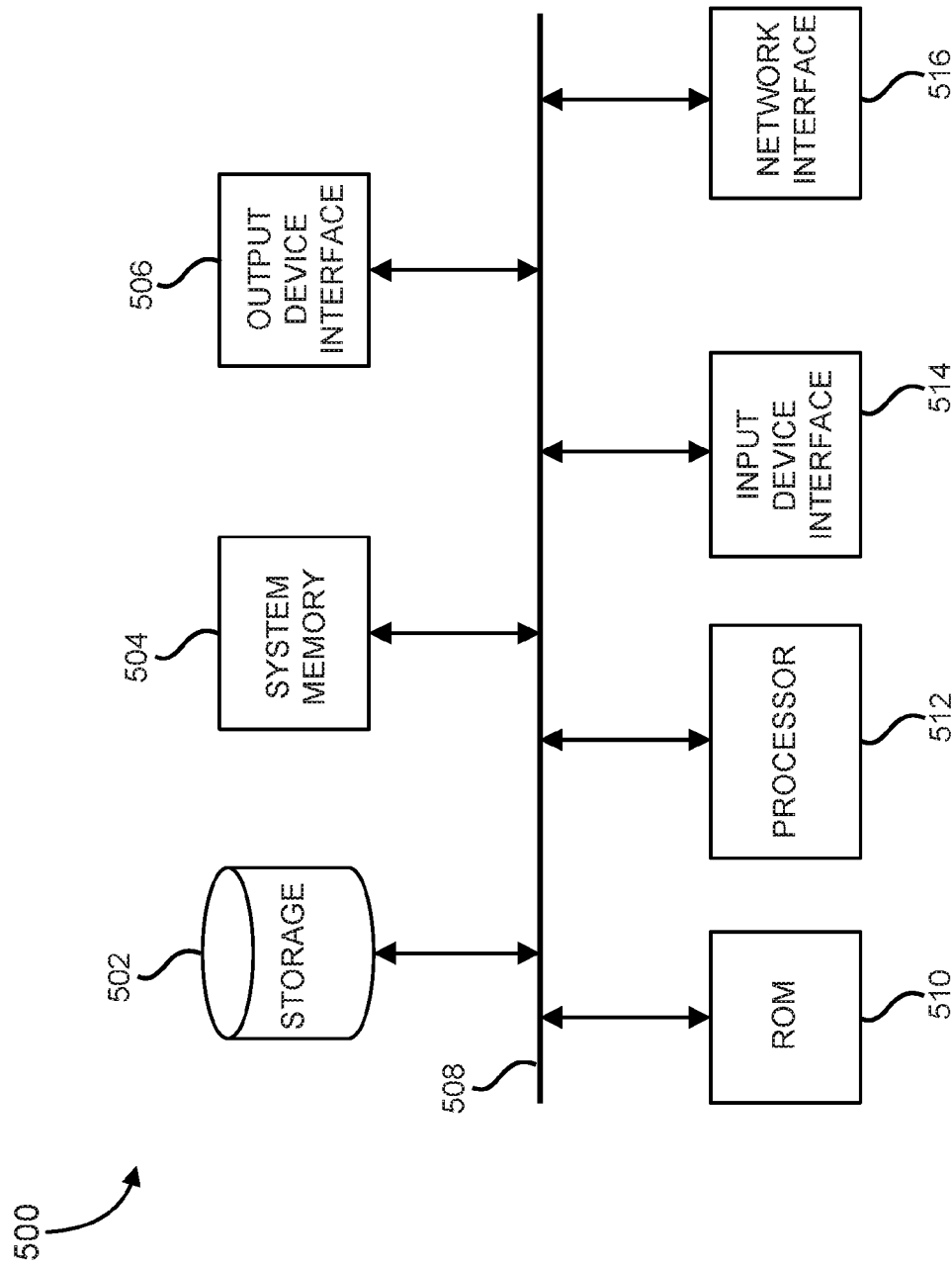
FIG. 5 conceptually illustrates an electronic system with which some aspects of the subject technology are implemented.

FIG. 5 conceptually illustrates an electronic system with which some implementations of the subject technology are implemented. Electronic system 500 can be a server, computer, phone, PDA, a tablet computer, a television with one or more processors embedded therein or coupled thereto, or generally any electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is anon-volatile memory unit that stores instructions and data even when electronic system 500 is off. Some implementations of the subject disclosure use a mass-storage device such as a magnetic or optical disk and its corresponding disk drive) as permanent storage device 502.

Other implementations use a removable storage device such as a floppy disk, flash drive, and its corresponding disk drive as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, or ROM 510. For example, the various memory units may include instructions for facilitating do-not-disturb modes in accordance with some implementations of the subject technology. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices") Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

As shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc., flash memory (e.g., SD cards, mini-SD cards, micro-SD cards, etc.), magnetic or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

For example, the instructions for performing various operations may be stored in the memory units and implemented in one or more computer program products, for example, one or more modules of computer program instructions encoded on a computer readable medium for execution by, or to control the operation of, the electronic system 500, and according to any method known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python).

Instructions for performing various operations may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Various memory units may also be used for storing temporary variable or other intermediate information during execution of instructions to be executed by processing unit(s) 512.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, such as a data server, or that includes a middleware component, such as an application server, or that includes a front end component, such as a client computer having a graphical user interface or a Web browser through which a user can interact with an implementation of the subject matter described in this specification, or any combination of one or more such back end, middleware, or front end components. The components of the system can be interconnected by any form or medium of digital data communication, such as a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of operations described with respect to the blocks in the processes disclosed is an illustration of example approaches. Based upon design preferences, it is understood that the specific order or hierarchy of operations in the processes may be rearranged. Moreover, in some aspects and implementations, one or more of the operations in one or more blocks may not or need not be performed. Some of the operations in the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects Thus, the claims are not intended to be limited to the aspects shown herein, but are to be accorded the full scope consistent with the language claims, wherein reference to an element in the singular is not intended to mean "one and only one" unless specifically so stated, but rather "one or more," Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The term website, as used herein, may include any aspect of a website, including one or more web pages, one or more servers used to host or store web related content, and the like. Accordingly, the term website may be used interchangeably with the terms web page and server.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

What is claimed is:

1. A computer-implemented method comprising:
receiving a selection from a user of at least one communications feature accessible on at least one ancillary device belonging to the user and not accessible on a mobile device of the user to be temporarily disabled by a server when a do-not-disturb mode is activated on a mobile device of the user;
receiving, by the server from the mobile device of the user, a do-not-disturb notification indicating that the mobile device has activated the do-not-disturb mode indicative of a physical orientation of a display screen of the mobile device being downwardly facing; and
causing by the server, in response to receiving the do-not-disturb notification indicative of the physical orientation of the display screen of the mobile device being downwardly facing, the at least one communications feature accessible on the at least one ancillary device belonging to the user to be temporarily disabled by the server.

2. The method of claim 1, further comprising:
receiving a selection by the user of a communications feature associated with the mobile device from among the communication services to be temporarily disabled when the do-not-disturb mode is activated on the mobile device of the user; and
when the mobile device has activated the do-not-disturb mode, causing the selected communications feature associated with the mobile device to be temporarily disabled.

3. The method of claim 2, wherein the causing the selected communications feature associated with the mobile device to be temporarily disabled comprises causing receipt of new email messages by the mobile device to be temporarily suspended.

4. The method of claim 2, wherein the causing the selected communications feature associated with the mobile device to be temporarily disabled comprises causing incoming calls to the mobile device to be temporarily blocked.

5. The method of claim 2, wherein the causing the selected communications feature associated with the mobile device to be temporarily disabled and the causing the at least one communications feature accessible on the at least one ancillary device to be temporarily suspended comprises causing receipt of at least some synchronization messages by the mobile device and by the at least one ancillary device to be temporarily suspended.

6. The method of claim 2, wherein the causing the selected communications feature associated with the mobile device to be temporarily disabled and the causing the at least one communications feature accessible on the at least one ancillary device to be temporarily suspended comprises causing at least some communications messages sent to the mobile device and to the at least one ancillary device to be intercepted.

7. The method of claim 1, wherein the causing the at least one communications feature accessible on the at least one ancillary device to be temporarily disabled comprises causing receipt of new emails to a computer corresponding to the at least one ancillary device to be temporarily suspended.

8. The method of claim 1, wherein the causing the at least one communications feature accessible on the at least one ancillary device to be temporarily disabled comprises causing incoming calls to a phone corresponding to one of the at least one ancillary device to be temporarily blocked.

9. The method of claim 1, further comprising:
receiving an active notification from the mobile device indicating that the mobile device has switched from the do-not-disturb mode to an active mode; and
in response to the received active notification, causing the temporarily disabled at least one communications feature accessible on the at least one ancillary device to be enabled.

10. The method of claim 9, wherein the active notification from the mobile device is based on a second physical orientation of the mobile device.

11. The method of claim 10, wherein the second physical orientation of the mobile device comprises an orientation in which the display screen of the mobile device is not downwardly facing.

12. A computer-implemented method comprising:
providing a selection from a user of at least one communications feature accessible on at least one ancillary device belonging to the user and not accessible on a mobile device of the user to be temporarily disabled by a server when a do-not-disturb mode is activated on a mobile device of the user;
detecting whether the mobile device of the user is in one of a stationary display screen face down state or a moving display screen face down state; and
when the mobile device is in at least one of the stationary display screen face down state or the moving display screen face down state, sending a do-not-disturb notification causing a first communications feature associated with the mobile device and the at least one communications feature accessible on the at least one ancillary device to be temporarily disabled by the server.

13. The method of claim 12, wherein the causing the first communications feature associated with the mobile device to be temporarily disabled comprises causing at least some communications received by the mobile device related to the first communications feature to be intercepted.

14. The method of claim 12, wherein the sending the do-not-disturb notification to the server comprises sending the do-not-disturb notification to the server for causing a second communications feature associated with the mobile device to be temporarily disabled.

15. The method of claim 12, further comprising:
detecting that the mobile device is no longer in one of the stationary display screen face down state or the moving display screen face down state; and
in response to the detecting that the mobile device is no longer in one of the stationary display screen face down state or the moving display screen face down state, causing the temporarily disabled first communications feature associated with the mobile device to be enabled and sending an active notification to the server.

16. A system comprising:
one or more processors; and
a memory including instructions that, when executed by the one or more processors, cause the one or more processors to:
receive a selection from a user of at least one communications feature accessible on at least one ancillary device belonging to the user and not accessible on a mobile device of the user to be temporarily disabled by a server when a do-not-disturb mode is activated on a mobile device of the user;
receive, by the server from the mobile device of the user, a do-not-disturb notification indicating that the mobile device has activated the do-not-disturb mode indicative of a physical orientation of a display screen of the mobile device being downwardly facing; and
causing by the server, in response to receiving the do-not-disturb notification indicative of the physical orientation of the display screen of the mobile device being downwardly facing, the at least one communications feature accessible on the at least one ancillary device belonging to the user to be temporarily disabled.

17. A non-transitory machine-readable medium comprising instructions stored therein, which when executed by a machine, cause the machine to perform operations, the machine-readable medium comprising:
instructions for receiving a selection from a user of at least one communications feature accessible on at least one ancillary device belonging to the user and not accessible on a mobile device of the user to be temporarily disabled by a server when a do-not-disturb mode is activated on a mobile device of the user;
instructions for receiving, by the server from the mobile device of the user, a do-not-disturb notification indicating that the mobile device has activated the do-not-disturb mode indicative of a physical orientation of a display screen of the mobile device being downwardly facing; and
instructions for causing by the server, in response to receiving the do-not-disturb notification indicative of the physical orientation of the display screen of the mobile device being downwardly facing, the at least one communications feature accessible on the at least one ancillary device belonging to the user to be temporarily disabled.

18. The system of claim 16, wherein the one or more processors is caused to:
receive a selection by the user of a communications feature associated with the mobile device from among the communication services to be temporarily disabled when the do-not-disturb mode is activated on the mobile device of the user; and when the mobile device has activated the do-not-disturb mode, cause the selected communications feature associated with the mobile device to be temporarily disabled.

19. The system of claim 18, wherein the causing the selected communications feature associated with the mobile device to be temporarily disabled comprises causing receipt of new email messages by the mobile device to be temporarily suspended.

20. The system of claim 18, wherein the causing the selected communications feature associated with the mobile device to be temporarily disabled comprises causing incoming calls to the mobile device to be temporarily blocked.

* * * * *